(12) United States Patent
Ishikawa

(10) Patent No.: US 9,898,101 B2
(45) Date of Patent: Feb. 20, 2018

(54) INPUT DEVICE AND ELECTRONIC INFORMATION BOARD SYSTEM WITH A MOVABLE OBJECT MOVABLE IN A SLANT DIRECTION

(71) Applicant: Naoyuki Ishikawa, Kanagawa (JP)

(72) Inventor: Naoyuki Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 14/875,889

(22) Filed: Oct. 6, 2015

(65) Prior Publication Data

US 2016/0116996 A1    Apr. 28, 2016

(30) Foreign Application Priority Data

Oct. 24, 2014    (JP) .................................. 2014-217252

(51) Int. Cl.
*G06F 3/0354* (2013.01)
*G09G 3/36* (2006.01)
*G06F 3/041* (2006.01)
*G06F 3/038* (2013.01)
*G06F 3/042* (2006.01)

(52) U.S. Cl.
CPC ........ *G06F 3/03545* (2013.01); *G06F 3/0383* (2013.01); *G06F 3/0386* (2013.01); *G06F 3/03542* (2013.01); *G06F 3/0412* (2013.01); *G06F 3/0421* (2013.01)

(58) Field of Classification Search
CPC ............... G06F 3/03545; G06F 3/0412; G06F 3/03542; G06F 3/0386; G06F 3/0421; G06F 3/0383; G09G 3/3648
See application file for complete search history.

(56) References Cited

U.S. PATENT DOCUMENTS

2002/0167496 A1* 11/2002 Ding ....................... G06F 3/043
345/173
2014/0218344 A1    8/2014 Kuwata

FOREIGN PATENT DOCUMENTS

JP    2002-163070    6/2002
JP    2014-149760    8/2014

* cited by examiner

*Primary Examiner* — Temesghen Ghebretinsae
*Assistant Examiner* — Yaron Cohen
(74) *Attorney, Agent, or Firm* — Oblon, McClelland, Maier & Neustadt, L.L.P.

(57) ABSTRACT

An input device includes a casing having a concave compartment having an inner bottom end, the concave compartment formed at one end of an axis direction of the casing, a moveable object supported in the concave compartment and reciprocally moveable along the axis direction of the casing, and a transmitter to transmit a contact-detection signal of the input device contacting on a display face when the moveable object is pressed and moved into the inner bottom end of the concave compartment for a given distance. When the moveable object is pressed along the axis direction of the casing, the moveable object is moved into the inner bottom end along the axis direction of the casing, and when the moveable object is pressed along a direction slanted from the axis direction of the casing, the moveable object is moved into the inner bottom end along the slanted direction.

9 Claims, 8 Drawing Sheets

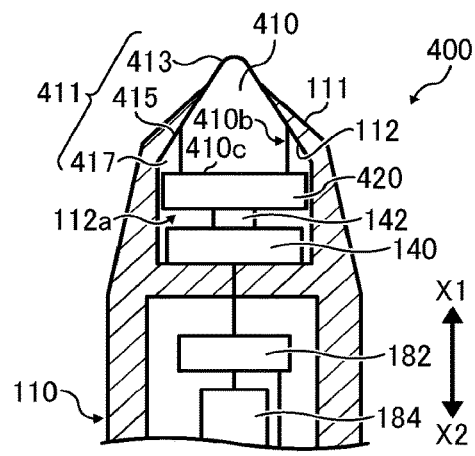

INPUT DEVICE AND ELECTRONIC INFORMATION BOARD SYSTEM WITH A MOVABLE OBJECT MOVABLE IN A SLANT DIRECTION

CROSS-REFERENCE TO RELATED APPLICATION

This application claims priority pursuant to 35 U.S.C. § 119(a) to Japanese Patent Application No. 2014-217252, filed on Oct. 24, 2014 in the Japan Patent Office, the disclosure of which is incorporated by reference herein in its entirety.

BACKGROUND

Technical Field

The present invention relates to an input device, and an electronic information board system employing the input device.

Background Art

Typically, an electronic information board system is configured with an electronic pen used as a drawing device, and a display. Text, characters and figures can be written and displayed on the display by contacting one end of the electronic pen on the display, in which a contact of the electronic pen and the display is required to be detected to display images written on the display. For example, the electronic pen includes a pen-end moveable unit that can move reciprocally in the axis direction of the electronic pen, and a pressure switch that can be pressed by the front-end moveable unit when the front-end moveable unit is moved into one direction such as inner ward of the electronic pen. When the pen-end moveable unit contacts the display and the pressure switch is pressed, the contact of the electronic pen and the display can be detected.

However, conventional electronic pen including the pressure switch cannot detect the contact of the electronic pen and the display under some conditions. For example, when the electronic pen is contacted on a display face while slanting the electronic pen with respect to the display face, a pressing direction of the electronic pen with respect to the display face and a movement direction of the pen-end moveable unit of the electronic pen may not align on the same direction, with which the pen-end moveable unit cannot be smoothly moved into the inside of the electronic pen and the pressure switch cannot be pressed, and thereby the contact of the electronic pen and the display cannot be detected.

SUMMARY

As one aspect of the present invention, an input device is devised. The input device includes a casing having a concave compartment having an inner bottom end, in which the concave compartment is formed at one end of an axis direction of the casing, a moveable object supported in the concave compartment and reciprocally moveable along the axis direction of the casing, and a transmitter to transmit a contact-detection signal of the input device contacting at one or more positions on a display face when the moveable object is pressed and moved into the inner bottom end of the concave compartment for a given distance. When the moveable object is pressed along the axis direction of the casing, the moveable object is moved into the inner bottom end along the axis direction of the casing, and when the moveable object is pressed along a direction slanted from the axis direction of the casing, the moveable object is moved into the inner bottom end along the slanted direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is an expanded cross-sectional view of a front end portion of an input device according to a first example embodiment;

FIG. 9 is a perspective view of a front-end moveable object of the input device of FIG. 8;

FIG. 10 is a schematic view of the input device when a writing unit of the input device is contacted on the display face;

Figure 1:
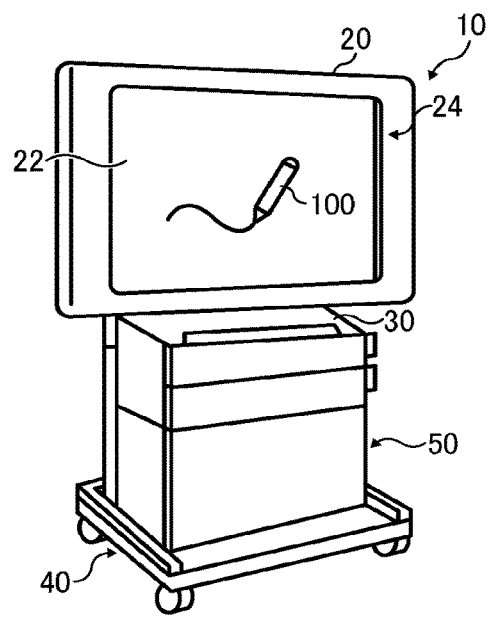
FIG. 1 is a schematic perspective view of an electronic information board system employing an input device according to one or more example embodiments.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

An input device according to one or more example embodiments of the present invention includes, for example, a front-end moveable object and a rear-end moveable object that can move reciprocally in the axis direction of a casing of the input device, and the front-end moveable object and the rear-end moveable object can also move in a direction slanted from the axis direction of the input device. With this configuration, even if the input device contacts a display face of a display in a direction slanted from the display face, the front-end moveable object and the rear-end moveable object can move smoothly into an inner bottom end of the casing of the input device, with which a contact of the input device and the display can be detected. A description is now given of exemplary embodiments of the present invention with reference to drawings.

(Configuration of Electronic Information Board System)

FIG. 1 is a schematic perspective view of an electronic information board system 10 that can employ an input device according to one or more example embodiments. The electronic information board system 10 is described as an example of electronic information systems. At first, the electronic information board system 10 employing an input device 100 is described, wherein the input device 100 known as an electronic pen having a pen-like shape is described as a related art because the input device 100 has some common parts to be used for an input device 400 according to one or more example embodiments to be described later. As illustrated in FIG. 1, the electronic information board system 10 includes, for example, a display 20, a stand 40, and a device container 50. The display 20 is, for example, a flat panel such as liquid crystal panel or plasma panel. The display 20 is configured with a display face 22 and a touch panel 24, used as a coordinate detector, disposed at a front side of the display 20. The display face 22 can be used to display images such as still images and movie images with or without audio or sound. Further, as to the electronic information board system 10, images such as text, characters and figures can be written on the display face 22 by contacting one end of the input device 100, used as a writing device, onto the touch panel 24.

When a front-end (i.e., writing end) of the input device 100 is contacted or pressed against the display face 22, the input device 100 outputs or transmits a writing-detection signal (i.e., contact-detection signal) as wireless signals (e.g., light signal such as infrared ray). When the display 20 receives the writing-detection signal transmitted from the input device 100, the display 20 displays characters and/or figures written at coordinate positions contacted by the input device 100 and then detected by the touch panel 24 on the display face 22.

Further, as to the input device 100, when a rear-end of the input device 100, which is another end of the input device 100, is contacted or pressed against the display face 22, the input device 100 outputs or transmits an erasing-detection signal (i.e., contact-detection signal) as wireless signals (e.g., light signal such as infrared ray). When the display 20 receives the erasing-detection signal transmitted from the input device 100, the display 20 erases characters and/or figures written at the coordinate positions detected by the touch panel 24 from the display face 22. When the erasing operation is conducted, a controller 60 (see FIGS. 3 and 4) performs processing that sets a color of detected coordinate positions with the same color of a background color (e.g., white). The device container 50 can encase various devices such as a printer and a video disk in addition to the controller 60 to be described later. Further, a keyboard 30 used for an inputting operation can be disposed on an upper side of the device container 50.

(Configuration of Input Device)

Figure 2:
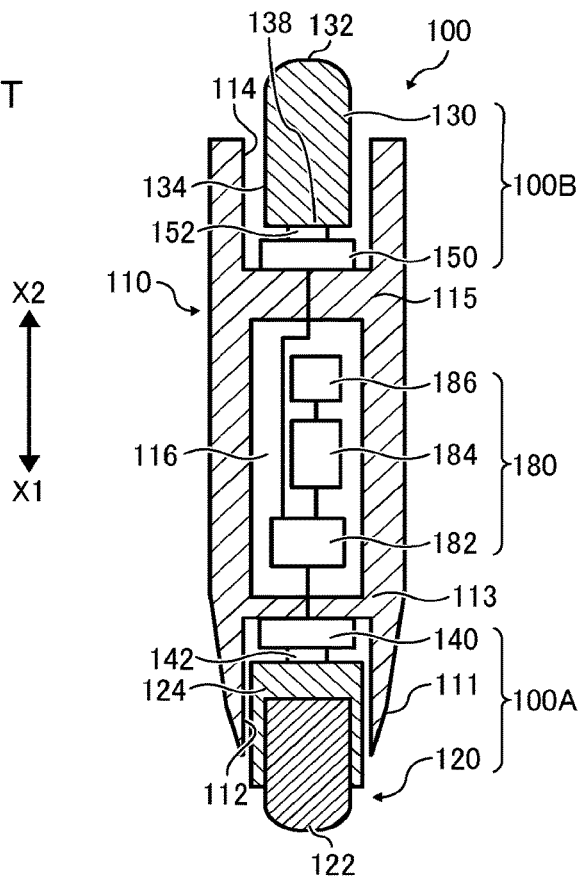
FIG. 2 illustrates a cross-sectional view of an input device of a related art.

A description is given of a configuration of the input device 100 of the related art with reference to FIG. 2, which can be used as a basic configuration of the input device 400 according to one or more example embodiments to be described later with reference to FIGS. 8 to 14. FIG. 2 illustrates a cross-sectional view of the input device 100. As illustrated in FIG. 2, the input device 100 includes, for example, a casing 110 having a cylinder shape, a writing unit 100A, and an erasing unit 100B. The writing unit 100A disposed at one end of the casing 110, and the erasing unit 100B disposed at another end of the casing 110 as illustrated in FIG. 2. The writing unit 100A includes, for example, a front-end moveable unit 120 and a front end detection switch 140 inside a front-end concave compartment 112 disposed at a front end of the casing 110. Further, the eraser unit 100B includes, for example, a rear-end moveable unit 130 and a rear end detection switch 150 inside a rear-end concave compartment 114 disposed at a rear end of the casing 110.

Each of the front-end detection switch 140 and the rear-end detection switch 150 employ, for example, a push switch. The front-end detection switch 140 includes a front-end moveable member 142 protruded along the axis direction of the casing 110, and the rear-end detection switch 150 includes a rear-end moveable member 152 protruded along the axis direction of the casing 110. The front-end moveable member 142 is spaced apart from the front-end moveable unit 120 with a tiny clearance, and the rear-end moveable member 152 is spaced apart from the rear-end moveable unit 130 with a tiny clearance.

When the front-end moveable unit 120 is moved for a given distance or more in the tiny clearance along the axis direction of the casing 110 (i.e., when the front-end moveable unit 120 is pressed toward the front-end concave compartment 112 along the axis direction), the front-end moveable member 142 is pressed, with which the front-end detection switch 140 is switched from OFF to ON, and a detection signal is output, which means the given distance is used as a distance that switches the front-end detection switch 140 from OFF to ON.

Further, when the rear-end moveable unit 130 is moved for a given distance or more in the tiny clearance along the axis direction of the casing 110 (i.e., when the rear-end moveable unit 130 is pressed inside toward the rear-end concave compartment 114 along the axis direction), the rear-end moveable member 152 is pressed, with which the rear-end detection switch 150 is switched from OFF to ON, and a detection signal is output, which means the given distance is used as a distance that switches the rear-end detection switch 150 from OFF to ON.

One end of the front-end detection switch 140 is fixed on a wall 113 formed at an inner bottom end in the front-end concave compartment 112. One end of the rear-end detection switch 150 is fixed on a wall 115 formed at an inner bottom end in the rear-end concave compartment 114.

Further, the front-end detection switch 140 includes a spring to press the front-end moveable member 142 protruded from an end to an off-position. Further, the rear-end detection switch 150 includes a spring to press the rear-end moveable member 152 protruded from an end to an off-position.

Further, the input device 100 includes, for example, a transmission circuit 180 (transmitter) in an internal space 116 of the casing 110. As illustrated in FIG. 2, the transmission circuit 180 includes, for example, a signal input unit 182, a signal processing unit 184, and a detection signal outputting unit 186. The signal input unit 182 is input with a detection signal from the front-end detection switch 140 and the rear-end detection switch 150. The signal processing unit 184 converts a detection signal input via the signal input unit 182 to a wireless signal. The detection signal outputting unit 186 outputs or transmits the wireless signal such as infrared ray generated at the signal processing unit 184. It should be noted that the wireless signals is not limited infrared ray, but other signals such as radio wave, light, sound wave can be used for the wireless signals.

(Electronic Information Board System)

Figure 3:
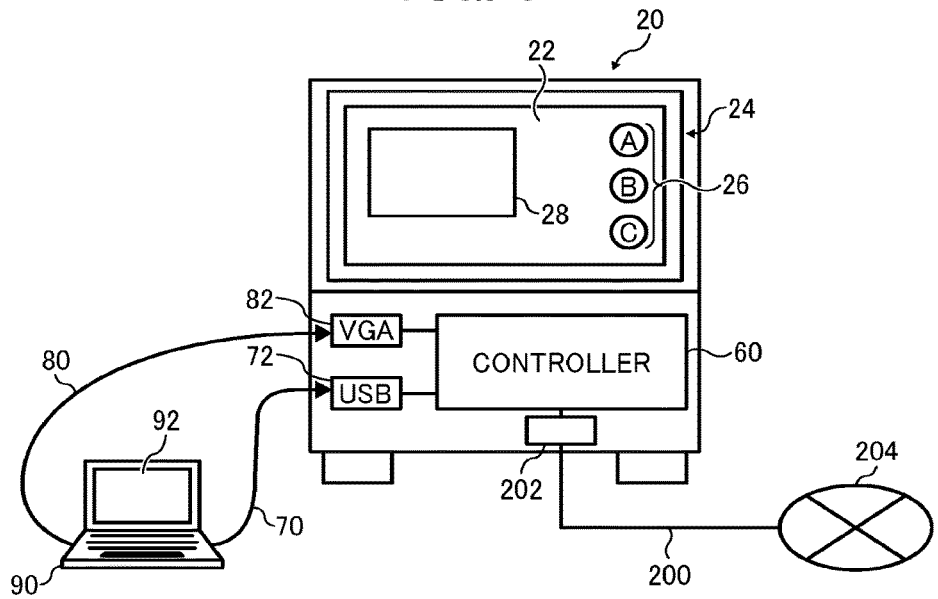
FIG. 3 is a schematic view of a main section of the electronic information board system.
Figure 4:
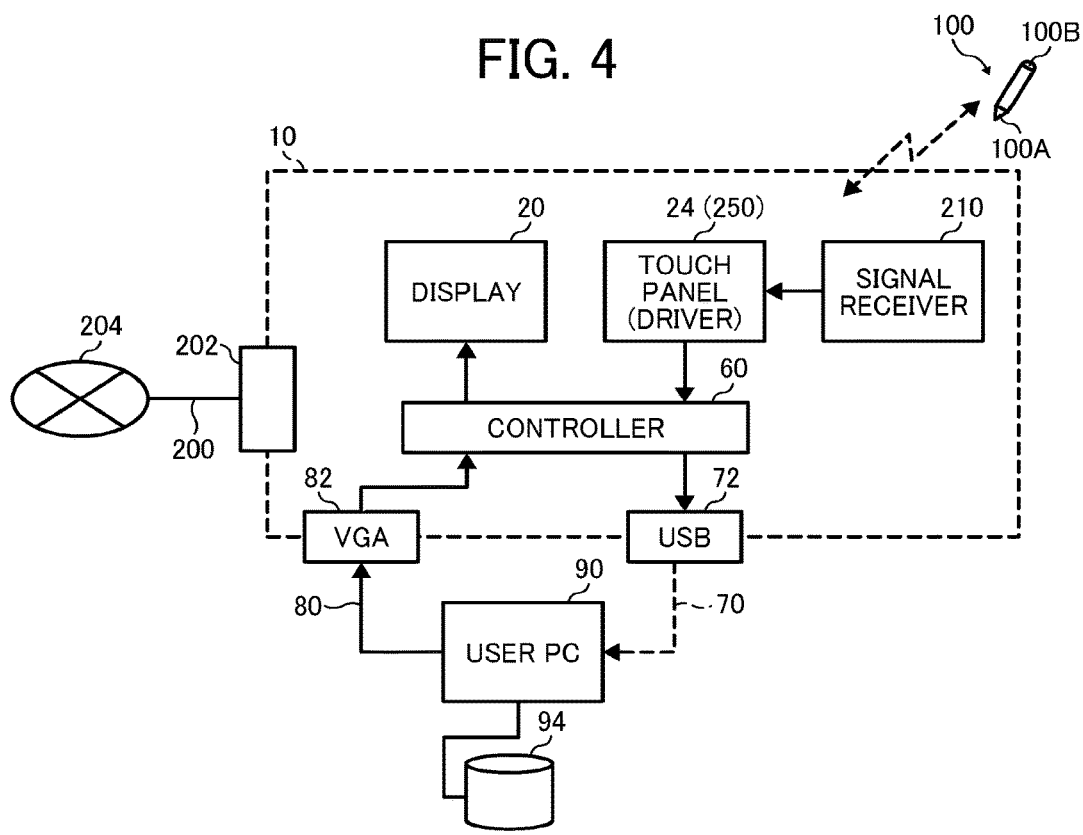
FIG. 4 is a block diagram of a control system of the electronic information board system.

FIG. 3 is a schematic view of devices configuring the electronic information board system 10. FIG. 4 is a block diagram of a control system of the electronic information board system 10. Hereinafter, a description is given of features of the electronic information board system 10. As illustrated in FIGS. 3 and 4, the display 20 can be controlled by the controller 60, and the display 20 can display images received from a user PC 90 or a screen operation unit 26 used for instructing operations on the display face 22. Further, the controller 60 includes, for example, a universal serial bus (USB) port 72 and a video graphics array (VGA) input port 82 used for connecting with external connection terminals. The USB port 72 can be connected with a USB cable 70, and the VGA input port 82 can be connected with a VGA cable 80.

The user PC 90 can be connected to the controller 60 via the USB port 72 and the VGA input port 82 as illustrated in FIG. 3. Further, as illustrated in FIG. 4, the user PC 90 can be connected to a storage 94 such as a magnetic disk or the like that stores various programs such as various contents and contents-display applications or the like. The user PC 80 includes a monitor 92 used for displaying an image. When a desired content is selected from the contents stored in the storage 94 by a user operation, the monitor 92 displays the selected content thereon. Therefore, when image data displayed on the monitor 92 of the user PC 90 is transmitted from the user PC 90 to the controller 60 via the USB cable 70 and the VGA cable 80, the controller 60 displays the same image displayed on the monitor 92 on a user-PC-image display area 28 on the display 20.

Further, the controller 60 can be connected to a network 204 such as the Internet or a local area network (LAN) via a communication line 200 (e.g., optical fiber) and a network port 202. Further, as illustrated in FIG. 4, the electronic information board system 10 includes a signal receiver 210 that can receive a detection signal output or transmitted from the input device 100. Upon receiving a detection signal from the input device 100, the signal receiver 210 inputs the detection signal to the touch panel 24. With this configuration, a touch panel driver 250 (see FIG. 5) used as a control circuit of the touch panel 24 detects or recognizes that an input by the input device 100 is performed on the display face 22 based on the detection signal output from the input device 100, and outputs the detection signal to the controller 60.

(Control System of Electronic Information Board System)

Figure 5A:
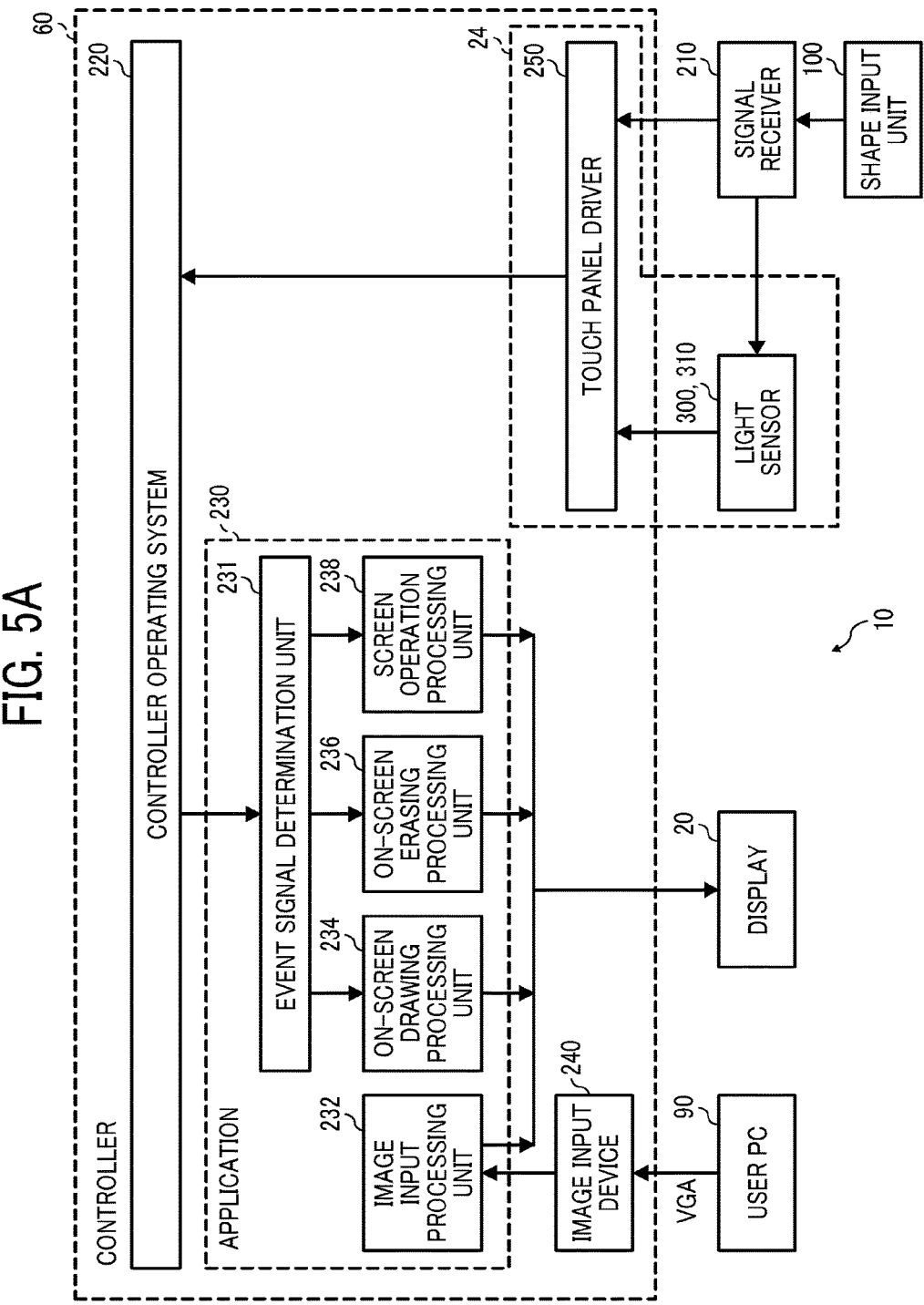
FIG. 5A is a block diagram of a controller of the electronic information board system.

FIG. 5A is a block diagram of the controller 60 of the electronic information board system 10. As illustrated in FIG. 5A, the controller 60 includes, for example, a controller operating system 220, an application system 230, an image input device 240, and a touch panel driver 250. Further, the application system 230 includes, for example, an event signal determination unit 231, an image input processing unit 232, an on-screen drawing processing unit 234, an on-screen erasing processing unit 236, and a screen operation processing unit 238.

The controller operating system 220 is a main controller that manages and executes control processing performed by the controller 60. The application system 230 performs various control processing such as a control of generating an image to be displayed on the display face 22 of the display 20, a control of displaying an image on the user-PC-image display area 28, and a control of displaying figures and characters when a writing detection signal by the input device 100 is detected. The event signal determination unit 231 monitors an event signal input from the controller operating system 220, and performs control processing corresponding to the input event signal. The image input processing unit 232 performs control processing for displaying an image, input from the user PC 90, on the user-PC-image display area 28 of the display face 22 of the display 20.

The on-screen drawing processing unit 234 generates a handwriting graphic image based on coordinate data of positions of the input device 100 on the touch panel 24, input via the event signal determination unit 231, and displays the handwriting graphic image on the display face 22 of the display 20. If an image is already displayed on the display face 22, the on-screen drawing processing unit 234 superimposes the handwriting graphic image on the image displayed on the display face 22 of the display 20.

Further, based on the coordinate data of positions on the touch panel 24, input via the event signal determination unit 231, the on-screen erasing processing unit 236 generates a graphic using a background color of a currently-displayed image, and superimposes the generated background color graphic on the image currently displayed on the display face 22 of the display 20. With this configuration, the background color graphic is superimposed on the handwriting graphic displayed on the display 20, with which the handwriting graphic can be erased from the display face 22 in appearance.

The screen operation processing unit 238 converts a coordinate position signal input from the touch panel 24 to a pointing device signal such as a mouse event, and performs processing based on an ON/OFF operation of the screen operation unit 26 displayed on the display face 22 of the display 21.

Further, the touch panel 24 includes a first sensor 300 and a second sensor 310 that emit light and receive reflection light reflected from an object, in which each of the first sensor 300 and second sensor 310 can be used as a light-emitting/receiving sensor. Information of contacting position coordinates of the input device 100 detected by first sensor 300 and the second sensor 310 of the touch panel 24 is transmitted to the controller operating system 220 with a coordinate value as a mouse-down event.

Further, when the input device 100 is moved while being contacted on the display face 22 of the touch panel 24, information of contacting position coordinates of the input device 100 is transmitted to the controller operating system 220 with a coordinate value as a mouse-up event.

The touch panel driver 250 converts a coordinate position signal, a writing detection signal, or an erasing detection signal, input from the input device 100 and the touch panel 24, to a given event signal, and transmits the event signal to the controller operating system 220. Further, upon receiving a writing detection signal or an erasing detection signal from the input device 100 via the signal receiver 210, the touch panel driver 250 transmits or transfers the writing detection signal or the erasing detection signal to the controller operating system 220 with a coordinate position signal.

Figure 5B:
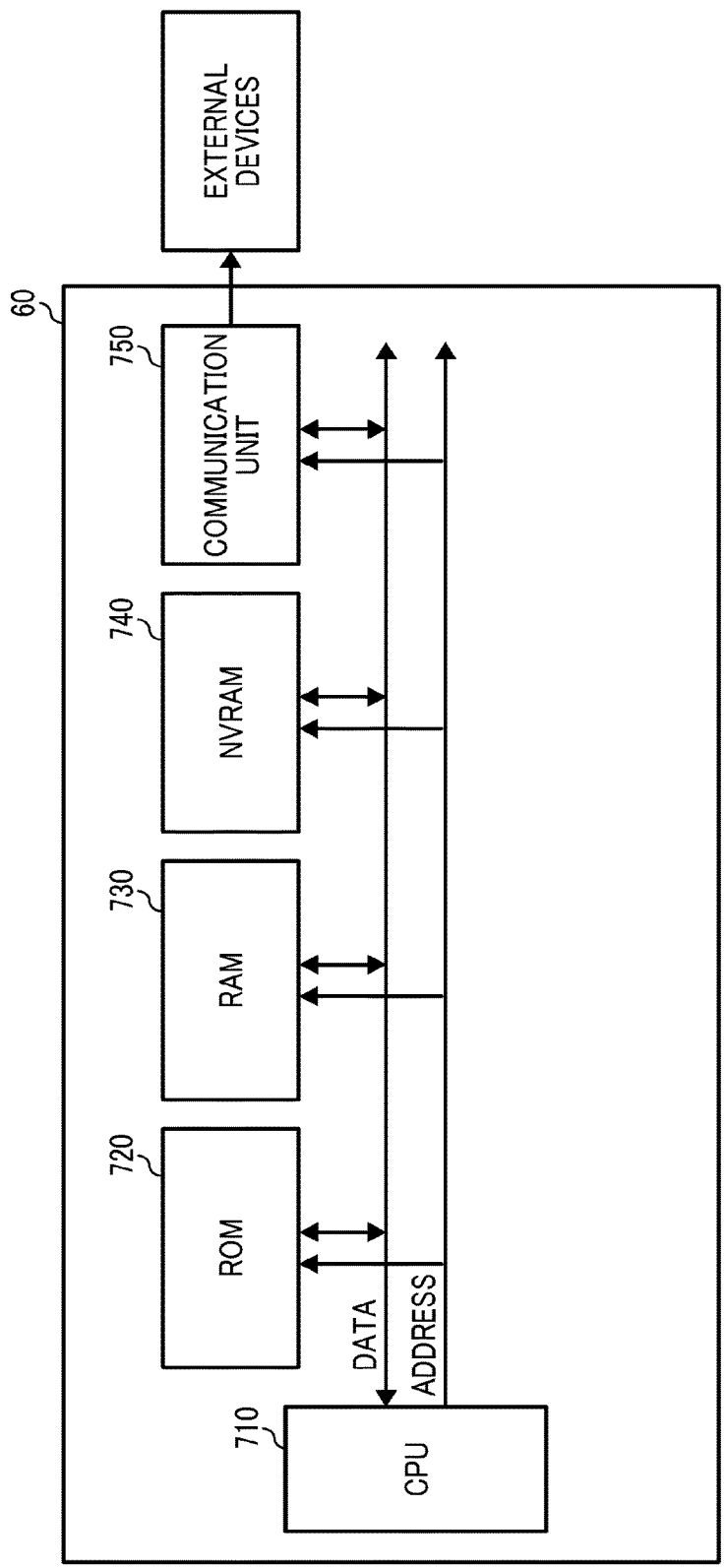
FIG. 5B is an example hardware configuration of the controller of the electronic information board system.

FIG. 5B is an example hardware configuration of the controller 60. The controller 60 includes, for example, a central processing unit (CPU) 710, a read only memory (ROM) 720, a random access memory (RAM) 730, a non-volatile RAM (NVRAM) 740, a communication unit 750. The ROM 720 stores programs executable by the CPU 710. The RAM 7030 is used as a working memory when executing the programs. The NVRAM 740 stores data such as input data, and can retain data even when the power-supply is shutdown. The communication unit 750 is used to communicate with other external devices such as the user PC 90, the display 20, and the sensors 300 and 310. Each of functional units of the controller 60 can be devised as a hardware or a combination of software and hardware. Specifically, data can be stored in the RAM, and the CPU 710 processes the data using programs stored in the ROM 720 to devise each of functional units of the controller 60. Further, each of functional units of the controller 60 can be devised using a hardware programmed to execute the functional units of the controller 60.

(Method of Detecting Coordinates of Input Device)

Figure 6:
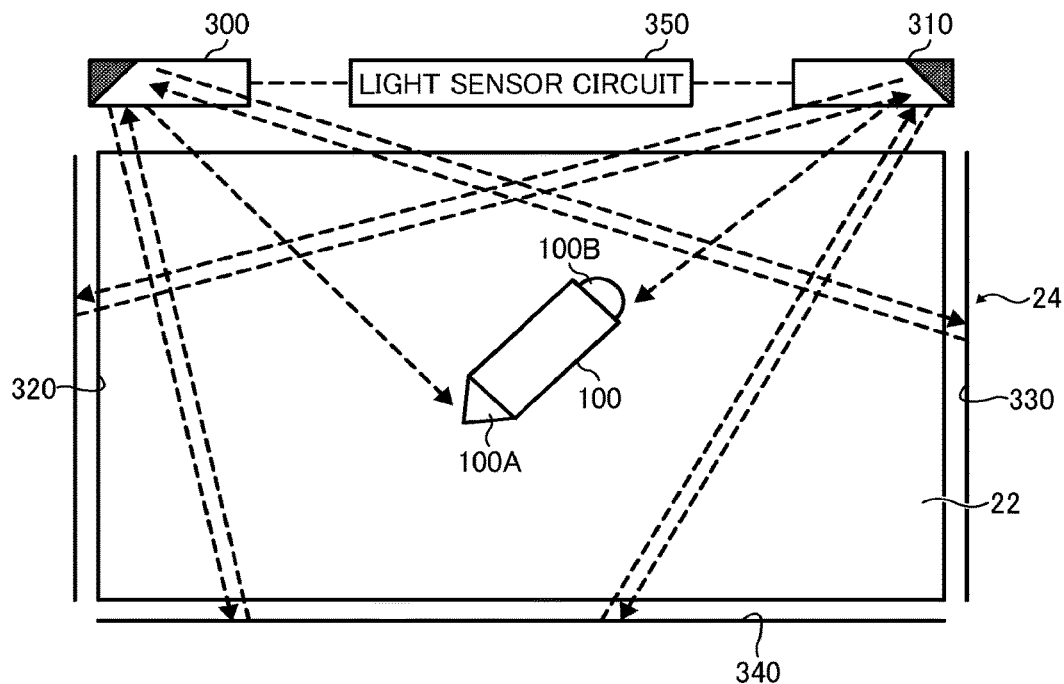
FIG. 6 is a schematic view of a touch panel used for detecting coordinate position of the input device.

FIG. 6 is a schematic view of the touch panel 24 used for detecting coordinate position of the input device 100. With reference to FIG. 6, a method of detecting coordinates of the input device 100 on the electronic information board system 10 is described. As illustrated in FIG. 6, the touch panel 24 is disposed with the first sensor 300 above the upper-left corner of the display face 22, and the second sensor 310 above the upper-right corner of the display face 22. Further, the touch panel 24 is disposed with reflection plates 320, 330, and 340 respectively at the left, right and bottom sides of the display face 22 as illustrated in FIG. 6.

The first sensor 300 disposed above the upper-left corner radiates infrared ray (i.e., probe light) along a plane parallel to the display face 22, and a radiation direction of infrared ray is directed to a substantially entire area of the reflection plate 330 at the right side and the reflection plate 340 at the bottom side. Further, the second sensor 310 disposed above the upper-right corner radiates infrared ray (i.e., probe light) along a plane parallel to the display face 22, and a radiation direction of infrared ray is directed to a substantially entire area of the reflection plate 320 at the left side and the reflection plate 340 at the bottom side. When nothing touches or contacts the display face 22, the infrared ray radiated from the first sensor 300 and the second sensor 310 is reflected at the reflection plates 320, 330, 340, and the reflection light is received by the first sensor 300 and the second sensor 310.

By contrast, when the front-end moveable unit 120 or the rear-end moveable unit 130 of the input device 100 contacts the display face 22, the infrared ray radiated from the first sensor 300 and the second sensor 310 is blocked by the input device 100 contacting the display face 22. Therefore, a sensor circuit 350 detects an angle with respect to the horizontal direction at a position where the infrared ray is blocked based on detection signals from the first sensor 300 and the second sensor 310, and computes coordinate positions using a formula of the fundamental of triangulation, and then converts the coordinate positions to X-Y coordinates. Then, coordinate position signals obtained by the sensor circuit 350 are input to the controller 60 via the touch panel driver 250. Then, upon receiving the process by the controller operating system 220, the coordinate position signals are transferred to the on-screen drawing processing unit 234, the on-screen erasing processing unit 236, and the screen operation processing unit 238.

(Operation of Input Device)

Figure 7:
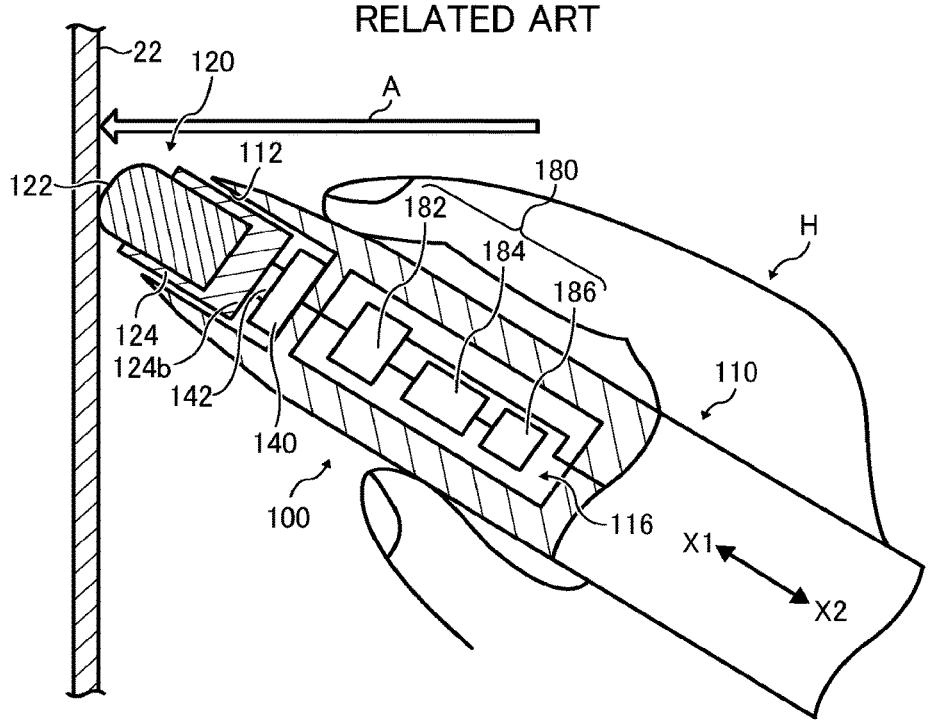
FIG. 7 is a schematic view of the input device when a writing unit of the input device is contacted on the display face.

FIG. 7 is a schematic view of the input device 100 when the writing unit 100A (FIG. 2) of the input device 100 is contacted on the display face 22. As illustrated in FIG. 7, a user or operator holds the casing 110 with a hand H when operating the input device 100. For example, the hand H holds a middle of the casing 110 in the axis direction, and a front end object 122 of the front-end moveable unit 120 of the input device 100 is contacted to the display face 22 of the display 20, and the casing 110 is pressed against the display face 22 into a direction indicated by an arrow A in FIG. 7. In this case, the front-end moveable unit 120 slides into the X2 direction in the front-end concave compartment 112 of the casing 110, and a press member 124b of a front-end retaining member 124 presses the moveable member 142 to set the front-end detection switch 140 at the ON position. Therefore, the front-end detection switch 140 is set ON, and a writing-detection signal is output from the input device 100. The writing-detection signal can be converted to a wireless signal by the transmission circuit 180, and output as the wireless signal. In this configuration, when the input device 100 is moved while maintaining the front-end detection switch 140 at the ON position, handwriting characters and/or figures can be displayed on the display face 22 based on the contacting positions of the moved front-end moveable unit 120.

However, as illustrated in FIG. 7, when the pressing direction A of the input device 100 against the display face 22 does not align the movement direction X2 of the front-end moveable unit 120, the front-end moveable unit 120 may not move smoothly, and thereby the contact of the front-end moveable unit 120 may not be detected correctly, in which a contact detection failure may occur. Therefore, an input device according to one or more example embodiments of the present invention is described hereinafter, in which a front-end moveable unit of the input device can be moved to a direction slanted from the axis direction of the input device to prevent the contact detection failure.

First Example Embodiment

A description is given of an input device 400 having a front-end moveable object 410 according to a first example embodiment with reference to drawings. FIG. 8 is an expanded cross-sectional view of a front end portion of the input device 400, and FIG. 9 is a perspective view of the front-end moveable object 410. As to the input device 400, when the front-end moveable object 410 is pressed into a direction slanted from the axis direction of the input device 400, the front-end moveable object 410 can be moved into the direction slanted from the axis direction of the input device 400. The input device 400 (FIG. 8) can employ some same parts of the input device 100 (FIG. 2), and thereby the same parts are not explained.

As to the input device 400, the front-end moveable object 410 is disposed in the front-end concave compartment 112 formed at a front end 111 of the casing 110, and the front-end moveable object 410 can move reciprocally along the axis direction of the casing 110 such as "X1-X2" direction. In this configuration, when the front-end moveable object 410 is pressed along the axis direction ("X1-X2" direction) of the casing 110, the front-end moveable object 410 can be moved into an inner bottom end 112a along the axis direction of the casing 110, and when the front-end moveable object 410 is pressed into the direction slanted from the axis direction of the casing 110, the front-end moveable object 410 can be also moved into the inner bottom end 112a along the slanted direction.

Specifically, as illustrated in FIG. 8, the front-end moveable object 410 has an outer face 413, wherein an outer diameter (outer circumference) of the outer face 413 gradually decreases as closer to the front end of the front-end moveable object 410. Further, the front-end concave compartment 112 has an inner face 415 that can contact the outer face 413, wherein an inner diameter (inner circumference) of the inner face 415 gradually decreases as closer to the front end of the front-end concave compartment 112, and a cross sectional shape of the outer face 413 and the inner face 415 are almost straight as illustrated in FIG. 8. For example, the outer face 413 can be formed as a cone shape as illustrated in FIG. 9. The outer face 413 can be used as a first face (guided face) guidable by the inner face 415 used as a second face (guide face), and the outer face 413 can be slideable on the inner face 415.

Further, the front-end moveable object 410 can be moved reciprocally along the slanted direction when the outer face 413 of the front-end moveable object 410 slides on the inner face 415 of the front-end concave compartment 112. Since the front-end moveable object 410 slides on the inner face 415, the front-end moveable object 410 is preferably made of resin having higher slideability such as polyacetal.

As illustrated in FIG. 9, the front-end moveable object 410 includes, for example, a front end 410a having the outer face 413 (first face), and a base 410b formed as a pillar shape. As illustrated in FIG. 8, a space 417 is set between the outer circumference surface of the base 410b of the front-end moveable object 410 and the inner face 415 of the front-end concave compartment 112. The space 417 is set at a portion closer to the inner bottom end 112a facing the inner face 415.

When the front-end moveable object 410 moves into the inner bottom end 112a along the slanted direction slanted from the axis direction, the space 417 can be used as a room for allowing the movement of the front-end moveable object 410, with which the front-end moveable object 410 can be moved. Further, an elastic member 420 is disposed between the front-end moveable object 410 and the moveable member 142 of the front end detection switch 140, and a bottom face 410c of the front-end moveable object 410 contacts the elastic member 420. For example, the elastic member 420 can be made of porous sponge, plate rubber or the like.

FIG. 10 is a schematic view of the input device 400 when a writing unit of the input device 400 is contacted on the display face 22. As illustrated in FIG. 10, the front-end moveable object 410 is contacted on the display face 22 while slanting the casing 110 with respect to the display face 22, and then the casing 110 is pressed to the display face 22 in a direction indicated by an arrow "A" that is perpendicular to the display face 22. In this case, the outer face 413 of the front-end moveable object 410 is guided by the inner face 415 of the front-end concave compartment 112, with which the front-end moveable object 410 can be moved into the inner bottom end 112a indicated by an arrow "B" along the direction slanted from the axis direction of the casing 110.

Since the space 417 is set between the inner face 415 of the front-end concave compartment 112 and the outer circumference surface of the base 410b of the front-end moveable object 410, the front-end moveable object 410 can be moved in the space 417. Different from the input device 100 illustrated in FIG. 7 as the related art, as to the first example embodiment, the pressing direction (direction of an arrow "A") of the casing 110 and the movement direction (direction of an arrow "B") of the front-end moveable object 410 are substantially parallel and the opposite directions. Therefore, the front-end moveable object 410 can be moved smoothly into the inner bottom end 112a.

When the front-end moveable object 410 moves into the inner bottom end 112a, the elastic member 420 is pressed by the front-end moveable object 410, in which one portion of the elastic member 420 is pressed with a greater force and elastically compressed greatly, and thereby the pressure can be transmitted to the front end detection switch 140 via the elastic member 420. In this configuration, the elastic member 420 can reduce the effect of uneven pressure distribution caused by the slanting of the bottom face 410c of the front-end moveable object 410 and by the slanted direction movement of the front-end moveable object 410 by deforming the elastic member 420 elastically in line with the slanting, with which the elastic member 420 can effectively press the moveable member 142 of the front end detection switch 140 along the axis direction of the casing 110. The front end detection switch 140 is switched from OFF to ON when the front end detection switch 140 is pressed by the elastic member 420. By disposing the elastic member 420 between the front-end moveable object 410 and the front end detection switch 140, an operational failure of the front end detection switch 140 can be prevented.

In the above described first example embodiment, the front-end concave compartment 112 and the front-end moveable object 410 are configured to move the front-end moveable object 410 into the inner bottom end 112a along the slanted direction of the casing 110 when the front-end moveable object 410 is pressed to the slanted direction slanted from the axis direction of the casing 110. Specifically, the front-end moveable object 410 includes the outer face 413 (first face or guided face) having the outer diameter decreased gradually toward the front edge, and the front-end concave compartment 112 includes the inner face 415 (second face or guide face) having the inner diameter decreased gradually toward the front edge, wherein the inner face 415 (second face) can contact the outer face 413 (first face). By sliding the outer face 413 (first face) of the front-end moveable object 410 on the inner face 415 (second face) of the front-end concave compartment 112, the front-end moveable object 410 can move reciprocally along the slanted direction slanted from the axis direction. With this configuration, even if the input device 400 contacts the display face 22 of the electronic information board system 10 from the slanted direction, the front-end moveable object 410 can be smoothly moved into the casing 110. Therefore, the contact of the input device 400 and the display face 22 can be detected without an operational failure. The front end detection switch 140 is a push switch provided with the moveable member 142 that can move along the axis direction of the casing 110.

If the moveable member 142 is pressed to the slanted direction slanted from the axis direction, the moveable member 142 may not be moved, and the front end detection switch 140 may not be activated. However, as to the first example embodiment, the elastic member 420 can reduce the effect of uneven pressure distribution caused by the slanting of the bottom face 410c of the front-end moveable object 410 and the slanted direction movement of the front-end moveable object 410 by deforming the elastic member 420 elastically in line with the slanting, in which elastic deformation of the elastic member 420 can mitigate the effect of the slanting of the bottom face 410c of the front-end moveable object 410. Therefore, the elastic member 420 can press the moveable member 142 of the front end detection switch 140 along the axis direction of the casing 110, with which an operational failure of the front end detection switch 140 can be prevented.

Second Example Embodiment

Figure 11:
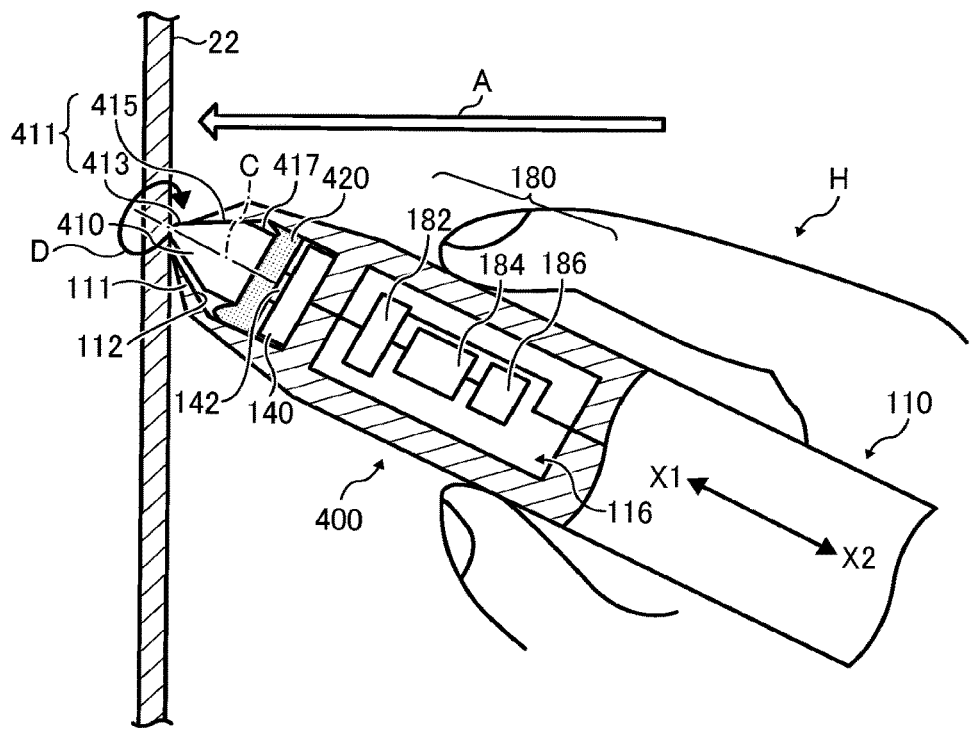
FIG. 11 is a schematic view of the input device of the first example embodiment when the writing unit of the input device is contacted on the display face, and the input device is moved along the display face

FIG. 11 is a schematic view of the input device 400 of the first example embodiment when the writing unit of the input device 400 is contacted on the display face 22, and the input device 400 is being moved on the display face 22. For example, the input device 400 can be contacted on the display face 22 from the slanted direction and moved in one direction on the display face 22, in which a contact position of the front-end moveable object 410 on the display face 22 may deviate from the center axis C of the front-end moveable object 410, and thereby the front-end moveable object 410 may rotate in a direction shown by an arrow "D" about the center axis C. Then, friction occurs between the front-end moveable object 410 and the elastic member 420, with which the elastic member 420 may wear. If powders generated by wearing of the elastic member 420 enters a space or clearance between the front end detection switch 140 and the moveable member 142, the moveable member 142 cannot be moved reciprocally, and thereby a contact of the front-end moveable object 410 to the display face 22 cannot be detected. Therefore, an input device of a second example embodiment includes a rotation blocker that can prevent a rotation of a front-end moveable object about the axis to prevent an operational failure of a front end detection switch.

Figure 12:
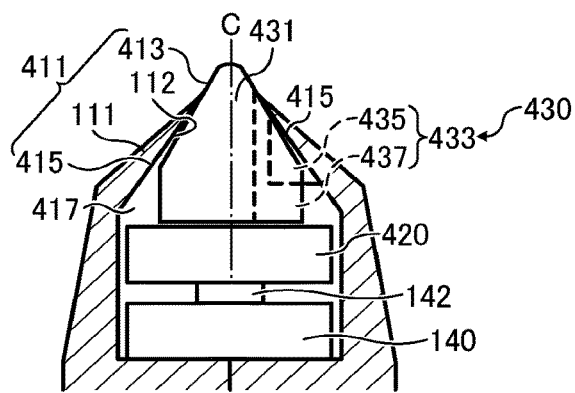
FIG. 12 is an expanded cross-sectional view of a front end portion of an input device having a front-end moveable object of a second example embodiment.
Figure 13A:
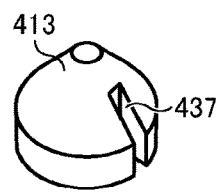
FIG. 13A is a perspective view of the front-end moveable object of FIG. 12.

FIG. 12 is an expanded cross-sectional view of a front end portion of an input device 430 having a front-end moveable object 431 of the second example embodiment. FIG. 13A is a perspective view of the front-end moveable object 431. The parts same as the first example embodiment are assigned with the same references and the explanation is omitted. As illustrated in FIG. 12, the input device 430 includes, for example, a rotation blocker 433 that blocks a rotation of the front-end moveable object 431 about the axis of the front-end moveable object 431.

Figure 13B:
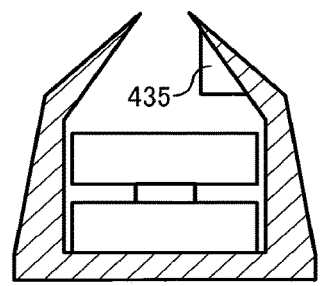
FIG. 13B is a cross-sectional view of the front end portion of the input device of FIG. 12.

As illustrated in FIGS. 13A and 13B, the rotation blocker 433 can be composed of, for example, a rotation block protrusion 435 and a rotation block protrusion receiver 437. The rotation block protrusion 435 protrudes from the inner face 415 of the front-end concave compartment 112 as illustrated in FIG. 12. The rotation block protrusion receiver 437 is formed into a shape engageable with the rotation block protrusion 435 of the front-end moveable object 431. As illustrated in FIGS. 12 and 13B, the rotation block protrusion 435 is formed at a part of the inner face 415 of the front-end concave compartment 112.

Further, the rotation block protrusion receiver 437 is a formed as a cut-out of the front-end moveable object 431 on an outer circumference surface of the front-end moveable object 431 as illustrated in FIG. 13A, wherein the cut-out is formed by cutting at a portion of the front-end moveable object 431 toward the center axis C. The rotation block protrusion 435 and the rotation block protrusion receiver 437 can be formed with the shape and size that can allow the movement of the front-end moveable object 431 to the axis direction and also the slanted direction while maintaining an engagement with each other in the movement range. By engaging the rotation block protrusion 435 and the rotation block protrusion receiver 437, the rotation of the front-end moveable object 431 about the axis of the front-end moveable object 431 can be blocked. With this configuration, wearing caused by the contact of the front-end moveable object 431 and others such as the elastic member 420 can be prevented, and thereby a correct operation of the front end detection switch 140 can be secured.

Third Example Embodiment

Figure 14A:
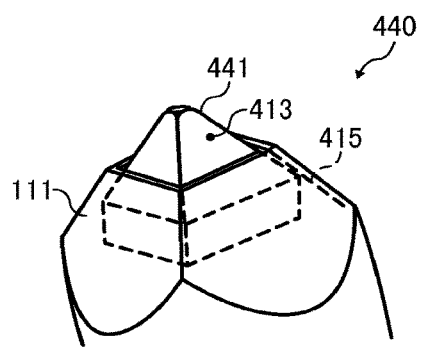
FIG. 14A is a perspective view of a front end portion of an input device having a front-end moveable object according to a third example embodiment.
Figure 14B:
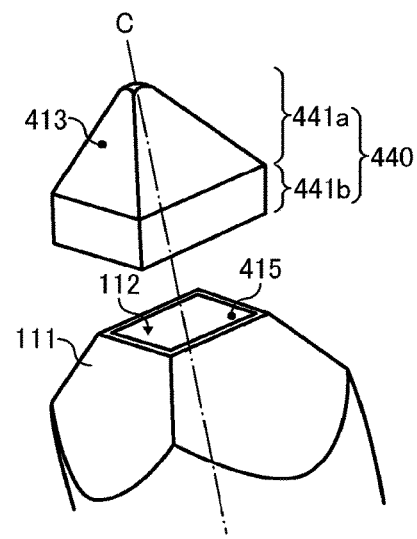
FIG. 14B is a disassembled perspective view of the input device of FIG. 14A.

FIG. 14A is a perspective view of a front end portion of an input device 440 having a front-end moveable object 441 according to a third example embodiment, and FIG. 14B is a disassembled perspective view of the input device 440. The parts same as the first and second example embodiments are assigned with the same references and the explanation is omitted. The front-end moveable object 441 includes, for example, a front end 441a, and a base 441b. The front end 441a is formed into a quadrangular pyramid shape having the outer face 413, and the base 441b is formed into a rectangular cylinder shape. The cross-sectional shape of the front-end moveable object 441 in a direction perpendicular to the axis direction is rectangular. As to the input device 440, the front-end concave compartment 112 has the inner face 415 that can engage the outer face 413 of the front-end moveable object 441. The inner face 415 is set parallel to the outer face 413. Further, the cross-sectional shape (i.e., opening shape) of the front-end concave compartment 112 in a direction perpendicular to the axis direction is rectangular.

By combining the front-end moveable object 441 having the outer face 413 varying an outer circumference length depending on a distance between each point on the outer face and the center axis C, and the front-end concave compartment 112 having the inner face 415 that can engage with the outer face 413 of the front-end moveable object 441, the rotation of the front-end moveable object 441 about the axis of the front-end moveable object 441 can be prevented similar to the second example embodiment. With this configuration, wearing of the elastic member 420 can be prevented, and thereby a correct operation of the front end detection switch 140 can be secured. As to the third example embodiment, the cross-sectional shape of the front-end moveable object 441 in a direction perpendicular to the axis direction and the cross-sectional shape of the front-end concave compartment 112 in a direction perpendicular to the axis direction can be rectangular, but can be other shapes such as polygon shape, star shape, or oval shape.

The above described example embodiments are applied to the front-end moveable unit 120 of the writing unit 100A of the input device 100 of the related art. Further, the above described example embodiments can be also applied to the rear-end moveable unit 130 of the eraser unit 100B of the input device 100 of the related art.

The above described example embodiments can be implemented with various configurations.

(First Configuration)

As to the first configuration, the input device includes the casing including a concave compartment (front-end concave compartment 112, rear-end concave compartment 114) having an inner bottom end formed at an one end of the axis direction of the casing (front end of the axis direction, rear end of the axis direction), the moveable object (front-end moveable object, rear-end moveable object) supported in the concave compartment to move reciprocally in the axis direction of the input device, the transmitter (transmission circuit 180) to transmit a contact-detection signal (writing-detection signal, erasing-detection signal) of the input device contacting at one or more positions on a plane when the moveable object is pressed and moved into the inner bottom end (inner bottom end 112a) of the concave compartment for a given distance. When the moveable object is pressed along the axis direction, the moveable object is moveable into the inner bottom end along the axis direction, and when the moveable object is pressed along a direction slanted from the axis direction, the moveable object is moveable into the inner bottom end along the slanted direction.

With this configuration, when the moveable object is pressed to the slanted direction slanted from the axis direction of the casing of the input device, the moveable object and the concave compartment are configured to allow the movement of the moveable object into the inner bottom end of the concave compartment along the slanted direction. Therefore, even if the input device is used to draw an image on the display face while slanting the input device to the display face, a contact of the input device and the display face can be detected.

(Second Configuration)

As to the second configuration, the moveable object (front-end moveable object, rear-end moveable object) has a first face (guided face) having an outer diameter decreased gradually toward the edge of the moveable object, and the concave compartment (front-end concave compartment 112, rear-end concave compartment 114) has a second face (guide face) formed as an inner face of the concave compartment, the second face (guide face) has an inner diameter decreased gradually toward an edge of the concave compartment. The first face (guided face) slideably contacts on the second face (guide face) to guide the moveable object into the (slanted) direction slanted from the axis direction of the input device.

With this configuration, even when the input device draws an image on the display face while contacting the display face from the slanted direction, the front-end moveable object can be smoothly moved into the inner bottom end in the concave compartment. Therefore, the contact of the input device and the display face can be detected without an operational failure.

(Third Configuration)

As to the third configuration, the input device further includes the detection switch (front end detection switch 140, rear end detection switch 150) disposed in the inner bottom end, and the elastic member disposed between the moveable object and the detection switch. The detection switch is pressable by the moveable object (front-end moveable object, rear-end moveable object) when the moveable object moves into the inner bottom end.

With this configuration, the elastic member can reduce the effect of uneven pressure distribution caused by the slanting of the moveable object and the slanted direction movement by deforming the elastic member elastically in line with the slanting, with which the elastic member can effectively press the detection switch along the axis direction of the casing of the input device, with which an operational failure of detection switch can be prevented.

(Fourth Configuration)

As to the fourth configuration, the moveable object (front-end moveable object, rear-end moveable object) includes a front end (front end 410a) having the first face (guided face), and a base (base 410b) formed as a pillar. The space (417) is set between an outer circumference surface of the base of the moveable object and the second face (guide face) of the concave compartment (front-end concave compartment 112, rear-end concave compartment 114). The space is set at a portion closer to the inner bottom end 112a facing the second face (guide face). As to the fourth configuration, the space is set between the outer circumference surface of the base of the moveable object and the second face (guide face) of the concave compartment, which means the space is formed at a portion closer to the inner bottom end facing the second face (guide face). When the moveable object moves into the inner bottom end along the slanted direction slanted from the axis direction, the space allows the movement of the moveable object because the space can be used as a room of the movement of the moveable object.

(Fifth Configuration)

As to the fifth configuration, the input device further includes the rotation blocker (433) to block a rotation of the moveable object (front-end moveable object, rear-end moveable object) about an axis of the moveable object.

With this configuration, the rotation of the moveable object about the axis can be blocked, with which wearing caused by the contact of the moveable object and other object can be prevented, and thereby a correct operation of the detection switch can be secured.

(Sixth Configuration)

As to the sixth configuration, the moveable object (front-end moveable object, rear-end moveable object) is formed with a pyramid shape, and the concave compartment (front-end concave compartment 112, rear-end concave compartment 114) has the second face (guide face, inner face) engageable to the pyramid shape of the moveable object.

With this configuration, the rotation of the moveable object about the axis can be blocked, with which wearing caused by the contact of the moveable object and other object can be prevented, and thereby a correct operation of the detection switch can be secured.

(Seventh Configuration)

As to the seventh configuration, the electronic information board system 10 includes, for example, the input device of the first to sixth configurations, the display 20 having the display face 22 to which the input device contacts, the coordinate detector (touch panel 24) to detect coordinates of the input device that contacts the display face 22, and the controller 60 to display an image based on the contact of the input device on the display 20 at the coordinates detected by the coordinate detector. With this configuration, the effect of the first to sixth configurations can be devised for the electronic information board system.

As to the above described input device including the moveable object and the concave compartment, when the moveable object is pressed to the slanted direction slanted from the axis direction of the casing of the input device, the moveable object and the concave compartment are configured to allow the movement of the moveable object into the inner bottom end of the concave compartment along the slanted direction. Therefore, even if the input device is used to draw an image on the display face while slanted to the display face, a contact of the input device and the display face can be detected.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An input device comprising:
   a casing having a concave compartment having an inner bottom end, the concave compartment formed at one end of an axis direction of the casing;
   a moveable object supported in the concave compartment and reciprocally moveable along the axis direction of the casing; and
   a transmitter to transmit a contact-detection signal of the input device contacting at one or more positions on a display face when the moveable object is pressed and moved into the inner bottom end of the concave compartment for a given distance, wherein
   the movable object has a first slanted face having an outer diameter decreased gradually toward a front edge of the moveable object,
   the concave compartment has a second slanted face having an inner diameter decreased gradually toward a front edge of the concave compartment, the second slanted face of the concave compartment is contactable with the first slanted face of the movable object,
   when the moveable object is pressed along the axis direction of the casing, the moveable object is moved into the inner bottom end along the axis direction of the casing,
   when the moveable object is pressed along a direction slanted from the axis direction of the casing, the moveable object is moved into the inner bottom end along the slanted direction, and
   the moveable object moves along a direction slanted from an axis direction of the input device when the first slanted outer face of the movable object slides on the second slanted face of the concave compartment.

2. The input device of claim 1 further comprising:
   a detection switch disposed in the concave compartment, press-able by the moveable object when the moveable object moves into the inner bottom end in the concave compartment; and
   an elastic member disposed between the moveable object and the detection switch.

3. The input device of claim 1, wherein the moveable object includes a front end having the first face, and a base formed of a pillar having an outer circumference surface,
   wherein a space is set between the outer circumference surface of the base of the moveable object and the second face of the concave compartment,
   when the moveable object moves into the inner bottom end along a slanted direction slanted from the axis direction of the casing, the space is used as a room for allowing the movement of the moveable object.

4. The input device of claim 1 further comprising:
   a rotation blocker to block a rotation of the moveable object about an axis of the moveable object.

5. The input device of claim 1, wherein the moveable object is formed of a pyramid, and the concave compartment has an internal structure engageable with the moveable object formed of the pyramid.

6. An electronic information board system comprising:
   a display having a display face to which the input device of claim 1 is contactable;
   a coordinate detector to detect coordinates of the input device on the display face when the input device contacts the display face; and
   a controller to display an image based on the coordinates of the input device on the display face detected by the coordinate detector.

7. An electronic information board system comprising:
   the input device of claim 1;
   a display having a display face to which the input device is contactable;
   a coordinate detector to detect coordinates of the input device on the display face when the input device contacts the display face; and
   a controller to display an image based on the coordinates of the input device on the display face detected by the coordinate detector.

8. The input device of claim 1, further comprising:
   a rotation blocker to block a rotation of the movable object,
   wherein the rotation blocker includes a rotation block protrusion being formed along an inner face of the concave compartment.

9. The input device of claim 8, wherein the rotation blocker further includes a rotation block protrusion receiver being formed along an outer face of the movable object.

* * * * *